(12) United States Patent
Al-Somani et al.

(10) Patent No.: US 8,755,517 B2
(45) Date of Patent: Jun. 17, 2014

(54) METHOD FOR GENERIC-POINT PARALLEL ELLIPTIC CURVE SCALAR MULTIPLICATION

(75) Inventors: Turki F. Al-Somani, Makkah (SA); Mohammad K. Ibrahim, Leicester (GB)

(73) Assignee: Total Technology Solutions Co., Makkah (SA)

( * ) Notice: Subject to any disclaimer, the term of this patent is extended or adjusted under 35 U.S.C. 154(b) by 860 days.

(21) Appl. No.: 12/963,524

(22) Filed: Dec. 8, 2010

(65) Prior Publication Data

US 2014/0105381 A1    Apr. 17, 2014

(51) Int. Cl.
*G06F 21/00* (2013.01)
(52) U.S. Cl.
USPC ............ 380/30; 380/28; 380/44; 380/259; 380/268
(58) Field of Classification Search
CPC .................................................. H04L 9/00
USPC ........................................... 380/30, 28
See application file for complete search history.

(56) References Cited

U.S. PATENT DOCUMENTS

| 6,826,586 | B2 | 11/2004 | Chang | |
|---|---|---|---|---|
| 7,853,012 | B2* | 12/2010 | Sarangarajan et al. | 380/28 |
| 8,045,705 | B2* | 10/2011 | Antipa et al. | 380/28 |
| 2003/0026419 | A1* | 2/2003 | Akishita | 380/30 |
| 2003/0059043 | A1* | 3/2003 | Okeya | 380/30 |
| 2007/0098154 | A1 | 5/2007 | Antipa et al. | |
| 2008/0019509 | A1 | 1/2008 | Al-Gahtani et al. | |
| 2009/0046851 | A1 | 2/2009 | Elmegaard-Fessel | |
| 2009/0052657 | A1 | 2/2009 | Golic | |
| 2009/0207997 | A1 | 8/2009 | Izu et al. | |
| 2009/0214023 | A1 | 8/2009 | Al-Somani et al. | |
| 2009/0214025 | A1 | 8/2009 | Golic | |
| 2010/0011047 | A1* | 1/2010 | Jackson et al. | 708/491 |

FOREIGN PATENT DOCUMENTS

CN        101366232 A    2/2009

OTHER PUBLICATIONS

Toru Akishita; Fast Simultaneous Scalar Multiplication on Elliptic Curve with Montgomery Form; Springer-Verlag Berlin Heidelberg 2001.*
Tetsuya Izu and Tsuyoshi Takagi, "Fast Elliptic Curve Multiplications Resistant against Side Channel Attacks", IEICE Trans. Fundamentals, vol. E88-A, No. 1, Jan. 2005.
Christophe Giraud and Vincent Verneuil, "Atomicity Improvement for Elliptic Curve Scalar Multiplication", arXiv:1002.4569v1 [cs.CR] Feb. 24, 2010.
Turki F. Al-Somani and Mohammad K. Ibrahim, "Generic-point Parallel Scalar Multiplication Without Precomputations", IEICE Electronics Express, vol. 6, No. 24, 1732-1736, Dec. 25, 2009.

* cited by examiner

*Primary Examiner* — Jason Lee
(74) *Attorney, Agent, or Firm* — Richard C Litman

(57) ABSTRACT

The method for generic-point parallel elliptic curve scalar multiplication replaces the pre-computation overhead of conventional elliptic curve scalar multiplication by post-computations that can be parallelized. This greatly increases the speed and efficiency of scalar multiplication performed in elliptic curve cryptography. According to the method, when scalar multiplication is required, the scalar integer is partitioned into a plurality of partitions, and calculations in each partition are performed simultaneously or in parallel on separate processors using conventional binary protocols. The bit size of each partition is adjusted to balance the load between the processors, i.e., so that each processor performs substantially the same number of point operations. The resulting calculations from each partition are accumulated or summed to produce the point that is the product of the scalar multiplication.

7 Claims, 2 Drawing Sheets

METHOD FOR GENERIC-POINT PARALLEL ELLIPTIC CURVE SCALAR MULTIPLICATION

BACKGROUND OF THE INVENTION

1. Field of the Invention

The present invention relates to cryptography systems and methods, and particularly to a method for generic-point parallel elliptic curve scalar multiplication that replaces the pre-computation overhead found in conventional elliptic curve scalar multiplication with post-computations that can be parallelized.

2. Description of the Related Art

Elliptic Curve Cryptosystems (ECC), originally proposed by Niel Koblitz and Victor Miller in 1985, offer a serious alternative to earlier public key cryptosystems, such as Rivest-Shamir-Adleman (RSA) and ElGamal, with much shorter key size. To date, no significant breakthroughs have been made in determining weaknesses in the ECC algorithm, which is based on the discrete logarithm problem over points on an elliptic curve. The fact that the problem appears so difficult to crack means that key sizes can be reduced considerably, even exponentially. This has caused ECC to become a serious challenger to RSA and ElGamal cryptosystems. Because of these advantages, ECC have been recently incorporated in many standards. ECC have gained popularity for cryptographic applications because of the short key, and are considered to be particularly suitable for implementation on smart cards or mobile devices.

An elliptic curve over a finite field GF(q) defines a set of points (x, y) that satisfy the elliptic curve equation together with the point O, known as the "point at infinity". The "point at infinity" does not satisfy the elliptic curve equation. The coordinates x and y of the elliptic curve points are elements of the field GF(q), where $q=p^m$ and p is prime.

Equations (1) and (2) define the elliptic curve equations for the fields GF(p) and GF($2^m$), respectively:

$$y^2 = x^3 + ax + b \qquad (1)$$

where a, b∈GF(p) and $4a+27b^2 \neq 0 \pmod{p}$; and $$y^2 + xy = x^3 + ax^2 + b \qquad (2)$$

where a, b∈GF($2^m$) and b≠0.

The set of discrete points on an elliptic curve form an abelian group (commutative group), whose group operation is known as point addition. Bounds for the number of discrete points n on an elliptic curve over a finite field GF(q) are defined by Hasse's theorem, given in Equation (3), where the symbol n represents the number of points on the elliptic curve and where $q=p^m$ represents the number of elements in the underlying finite field:

$$q+1-2\sqrt{q} \leq n \leq q+1+2\sqrt{q} \qquad (3)$$

Elliptic curve "point addition" is defined according to the "chord-tangent process". Point addition over GF(p) is described as follows: Let P and Q be two distinct points on an elliptic curve E defined over the real numbers with Q≠−P (Q is not the additive inverse of P). The addition of P and Q is the point R=P+Q, where R is the additive inverse of S, and S is a third point on the elliptic curve intercepted by the straight line through points P and Q. For the curve under consideration, R is the reflection of the point S with respect to the x-axis, that is, if R is the point (x, y), then S is the point (x,−y).

When P=Q and P≠−P, the addition of P and Q is the point R, where R=2P and R is the additive inverse of S, and S is the third point on the elliptic curve intercepted by the straight line tangent to the curve at point P. This operation is referred to as "point doubling".

The "point at infinity", O, is the additive identity of the group. The most relevant operations involving O are the following: the addition of a point P and O is equal to P (i.e., P+O=P); and the addition of a point P and its additive inverse, −P, is equal to O (i.e., P−P=O). If P is a point on the curve, then −P is also a point on the curve.

The point operation used by elliptic curve cryptosystems is referred to as point multiplication. This operation is also referred to as scalar point multiplication. The point multiplication operation is denoted as kP, where k is an integer number and P is point on the elliptic curve. The operation kP represents the addition of k copies of point P, as shown in Equation (4) below:

$$kP = \underbrace{P + P + \ldots + P}_{k \text{ times } P}. \qquad (4)$$

Elliptic curve cryptosystems are built over cyclic groups. Each group contains a finite number of points, n, that can be represented as scalar multiples of a generator point: iP for i=0, 1, ..., n−1, where P is a generator of the group. The order of point P is n, which implies that nP=O and iP≠O for 1≤i≤n−1. The order of each point on the group must divide n. Consequently, a point multiplication kQ for k>n can be computed as (k mod n)Q.

Scalar multiplication is the basic operation for ECC. Scalar multiplication in the group of points of an elliptic curve is the analogue of exponentiation in the multiplicative group of integers modulo a fixed integer m. Computing kP can be performed using a straightforward double-and-add approach based on the binary representation of $k=k_{l-1}, \ldots, k_0$ where $k_{l-1}$ is the most significant bit of k. Other scalar multiplication methods have been proposed in the literature.

One of the simplest scalar multiplication algorithms is the double-and-add point multiplication algorithm, which is the so-called binary algorithm. Algorithm 1 and 2 show the most-to-least and the least-to-most versions of the double-and-add scalar multiplication algorithms, respectively. The algorithms inspect the multiplier k. For each inspected bit, the algorithms perform a point double, and if the inspected bit is one, the algorithms also perform a point add:

---
Algorithm 1: Double-and-Add (most-to-least)
---
Inputs: P,k
Output: kP
Initialization:
   Q = P
Scalar Multiplication:
   for i = l −2 down to 0 do
      Q = 2Q
      if $k_i$ = 1 then Q = Q + P
   end for
return(Q)

---
Algorithm 2: Double-and-Add (least-to-most)
---
Inputs: P,k
Output: kP
Initialization:
   Q = O, R = P
Scalar Multiplication:
   for i = 0 to l −1 do
      if $k_i$ = 1 then Q = Q + R -continued

```
    R = 2R
  end for
return(Q)
```

The double-and-add scalar multiplication algorithms require, on average, l point doubles and l/2 point additions, where $l \approx |\log_2 k|$. These algorithms also require storing two points, P and Q.

As noted above, kP can be computed using a straightforward binary method based on the binary expression of multiplier k. A conventional prior art scalar multiplication method for elliptic cryptosystems is shown in the U.S. Patent Application Publication US 2009/0214023 A1, which is herein incorporated by reference in its entirety.

It is important to note that sequential scalar multiplication methods are too slow for high-performance end servers due to the demand resulting from increasing numbers of customers. Efficient scalar multiplication methods are now crucial for such servers. Scalar multiplication methods that can be parallelized are now being used to provide high-speed implementations.

Pre-computations have been used to speed up scalar multiplications, but they require sequential steps that cannot be parallelized, and they are primarily advantageous when the elliptic curve point is fixed. However, during secure communication sessions that use public keys, the elliptic curve point changes, as it depends on the public key of the communicating entity; i.e., it is session dependent. This is also the case when digital signatures are used.

Thus, the computation of scalar multiplications is generally performed with a generic elliptic curve point. Because of the likelihood that the elliptic curve point will be different for each session, the overhead resulting from the necessary pre-computations must be considered when estimating the total computational time required. Thus, a method for generic-point parallel elliptic curve scalar multiplication solving the aforementioned problems is desired.

SUMMARY OF THE INVENTION

The method for generic-point parallel elliptic curve scalar multiplication replaces the pre-computation overhead of conventional elliptic curve scalar multiplication by post-computations, which can be parallelized. This greatly increases the speed and efficiency of the scalar multiplication. The method is particularly useful for high-performance end servers that service demands from an increasing numbers of customers, since it speeds up scalar multiplications in any cryptographic system that utilizes elliptic curve cryptography.

According to the method, when scalar multiplication is required, the scalar integer is partitioned into a plurality of partitions, and calculations in each partition are performed simultaneously or in parallel on separate processors using conventional binary protocols. The bit size of each partition is adjusted to balance the load between the processors, i.e., so that each processor performs substantially the same number of point operations. The resulting calculations from each partition are accumulated or summed to produce the point that is the product of the scalar multiplication.

The method is of general application, and may be used wherever it is necessary to perform scalar multiplication, including public-key exchange, digital signatures, message encryption and decryption, etc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
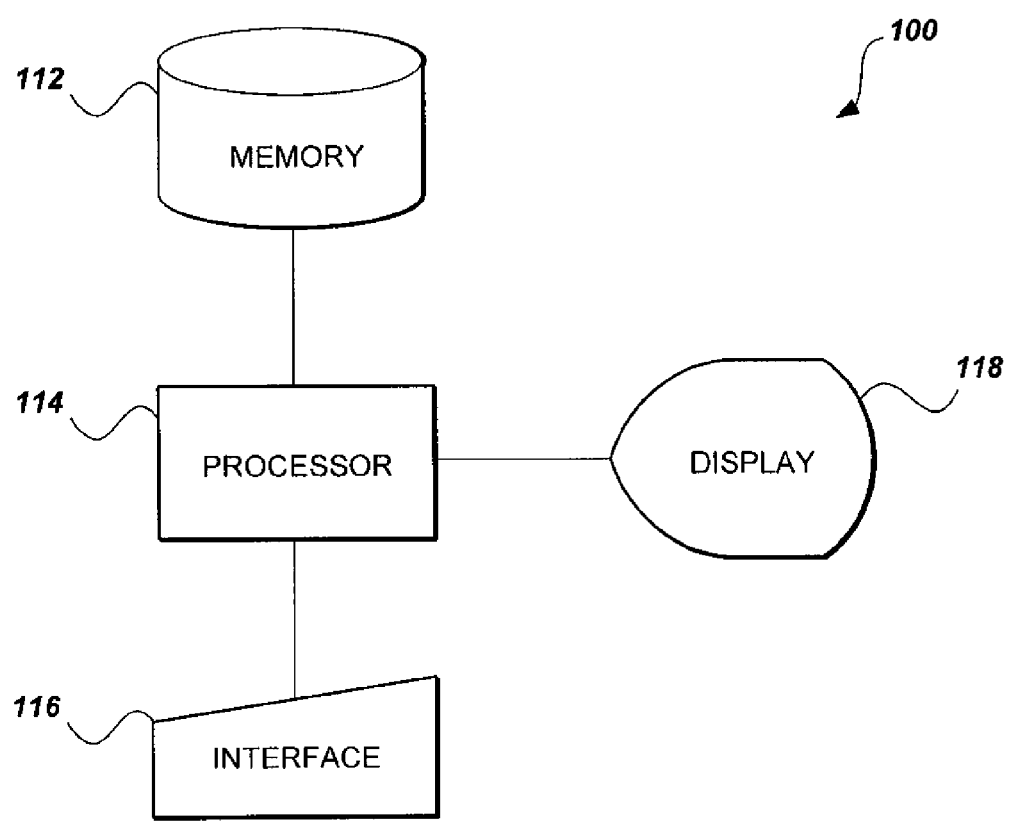
FIG. 1 is a block diagram illustrating system components of a system for implementing the method for generic-point parallel elliptic curve scalar multiplication according to the present invention.

The present invention is a method for generic-point parallel elliptic curve scalar multiplication. The method for generic-point parallel elliptic curve scalar multiplication replaces sequential pre-computations for conventional elliptic curve scalar multiplication with post-computations that may be performed in parallel in order to speed up computations, particularly for high-performance end servers that face demand from an increasing number of customers. The scalar integer k is partitioned into u partitions that can be processed in parallel by u processors using the binary method. Post-computations are then distributed on u−1 processors to be performed in parallel. The points that result from processing these key partitions with the post-computations are finally assimilated or summed (with adjustment to the appropriate power of base 2 according to the columnar position of the partition in the full binary representation of the scalar integer) to produce scalar multiplication kP, which is the product of the scalar k and the point P on the elliptic curve. Letting $k=(k_{m-1}, \ldots, k_0)$ be the binary representation of the scalar k where $k_{m-1}$ is the most significant bit of k, then, after partitioning k into u partitions, the scalar k can be written as:

$$k = (k^{(u-1)} \| k^{(u-2)} \| \ldots \| k^{(0)}) \quad (5)$$

Scalar multiplication product kP can then be computed as:

$$kP = \sum_{0 \leq i \leq u} t_i, \quad (6)$$

where $t_i$ is defined as:

$$t_i = 2(\ \ldots\ 2(2k_{iv+v-1}(2^{iv}P) + k_{iv+v-2}(2^{iv}P)) + \ldots + k_{iv+1}(2^{iv}P)) + \quad (7)$$
$$k_{iv+0}(2^{iv}P).$$

It is important to note that Eq. (7) can be rewritten as:

$$t_i = (2^{iv})[2(\ \ldots\ 2(2k_{iv+v-1}P + k_{iv+v-2}P) + \ldots + k_{iv+1}P) + k_{iv+0}P]. \quad (8)$$

Eq. (8) implies that the required pre-computations of Eq. (7) can be replaced by post-computations, which are point doublings. Each partition requires iv point doublings to produce the correct partial product. To balance the number of point operations, we need to balance the total number of field multiplications, as field multiplication is the dominant type of operation in elliptic curve point operations in projective coordinates. This implies that the scalar k should be partitioned into u partitions of different sizes, as shown below in Eq. (9):

$$m = m_{(u-1)} + m_{(u-2)} + \ldots + m_{(1)} + m_{(0)} \quad (9)$$

where m represents the number of bits in the scalar k in binary, and $m_{(u-1)}, m_{(u-2)}, \ldots, m_{(1)}, m_{(0)}$ represent the number of bits in each partition.

Accordingly, the number of bits in partition $t_{(i)}$ must be greater than the number of those in $t_{(i+1)}$ and fewer than the number of those in $t_{(i-1)}$, as can be seen from Eq. (10) below:

$$m_{(u-1)} < m_{(u-2)} < \ldots < m_{(1)} < m_{(0)}. \quad (10)$$

Assuming that the double and add point operations require r and s field multiplications, respectively, then we can let the total number of field multiplications in partition $k^{(i)}$ equal $M_{(i)}$. Because partition $k^{(0)}$ is the only one to require no post-computations, a balanced number of point operations can be reached by solving Eqs. (9) and (10) together with the following equations (11-13):

$$M_{(0)} = m_{(0)}(r) + \frac{m_{(0)}}{2}(s) \quad (11)$$

$$M_{(i)} = m_{(i)}(r) + \frac{m_{(i)}}{2}(s) + (r)\sum_{0 \le j < i} m_j \quad (12)$$

$$M_{(0)} = M_{(1)} = \ldots = M_{(u-1)}. \quad (13)$$

The computation of kP in parallel without pre-computations can be performed efficiently using the following algorithm:

---
Algorithm 3: Generic-Point Parallel Scalar Multiplication

1) Inputs: P, k
2) By padding k with zeros if necessary, solve Eqs. (9)-(13) together, and write k = ($k^{(u-1)} \| k^{(u-2)} \| \ldots \| k^{(0)}$), where $k^{(i)}$ is a partition of length $m_{(i)}$ bits
3) Initialization:
   Q ← P, R ← O
4) Parallel Scalar Multiplication:
   4.1) For i = 0 to u−1 do in parallel
      4.1.1) Q ← Binary method ($k^{(i)}$, P)
      4.1.2) If i > 0, then
         4.1.2.1) for c = 0 to $\left(\left(\sum_{0 \le j < i} m_j\right) - 1\right)$
            4.1.2.1.1) Q ← 2Q
      4.1.3) R ← R + Q
5) Output R
---

The pseudo code of the present method is given above in Algorithm 3. The partitioning of the multiplier k into u partitions with different sizes depends on solving equations (9)-(13) together to provide a balanced number of point operations for these different partitions. The partitioning step is performed at step 2. Parallel scalar multiplications start at step 4. Each partition is processed independently in parallel by an individual processor. Only partition $k^{(0)}$ does not require any post-computations. The remaining partitions need post-computations after executing the binary algorithm (step 4.1.1). Finally, the resulting points of each partition are accumulated in the accumulation point R (step 4.1.3), which requires u−1 extra point additions.

Figure 2:
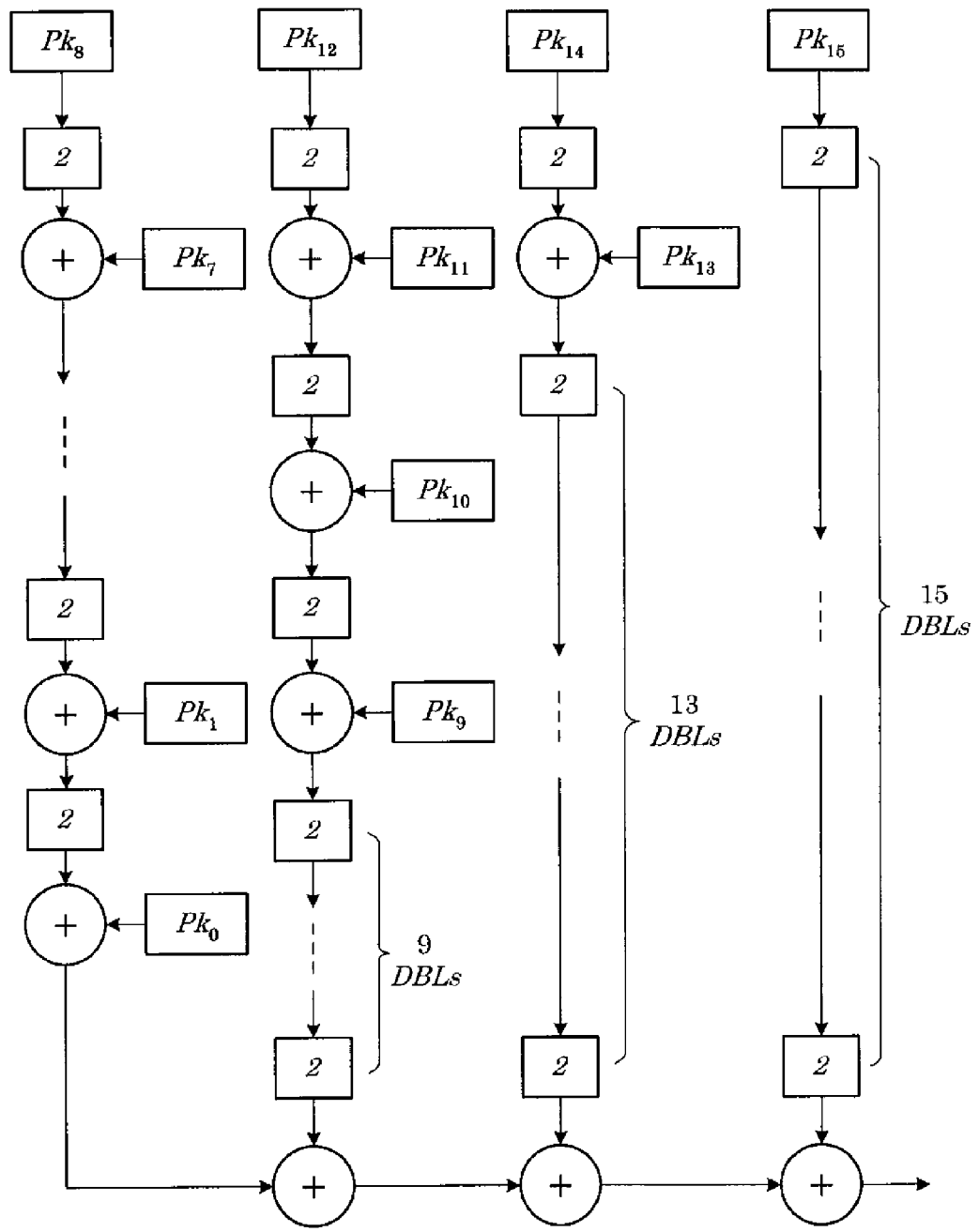
FIG. 2 diagrammatically illustrates dataflow of the method for generic-point parallel elliptic curve scalar multiplication for an exemplary case with m=16, u=4, and r=s/2.

FIG. 2 illustrates an exemplary data path of the present method with m=16, u=4, and r=s/2. Each key partition $k^{(i)}$ in FIG. 2 has a different size and is processed in an individual column by an individual processor. The resulting points of processing these key partitions are assimilated at the end to produce kP.

In the example of FIG. 2, we let k=(1000 0101 1100 0011)$_2$=(34243)$_{10}$, with m=16, u=4, and r=s/2. The sizes of the key partitions are $m_0$=9, $m_1$=4, $m_2$=2, and $m_3$=1. The key partitions are $k^{(0)}$=111000011, $k^{(1)}$=0010, $k^{(2)}$=00, and $k^{(3)}$=1. The scalar multiplication of these partitions is then computed in parallel according to the following:

$$t_0 = 2(2(2(2(2(2(2(2(1)P + (1)P) + (1)P) + (0)P) + (0)P) + (0)P) + (0)P) + (1)P) + (1)P = 451P;$$

$$t_1 = (2^9)[2(2(2(0)P + (0)P) + (1)P) + (0)P] = 1024P;$$

$$t_2 = (2^{13})[2(0)P + (0)P] = 0;$$

and $$t_3 = (2^{15})[(1)P] = 32768P.$$

Finally, kP is computed as:

$$kP = t_0 + t_1 + t_2 + t_3 = 451P + 1024P + 0 + 32768P = 34243P.$$

The time required to perform the scalar multiplication for partition $k^{(0)}$, which requires no post-computations, is the same as that required for the remaining partitions. Thus, the time complexity of the proposed method is equal to $m_0$ point doublings and ($m_0/2+u-1$) point additions. However, the accumulation process can be further enhanced if more than one processor is involved in the accumulation process, which reduces the accumulation time to $\log_2(u)$ point additions. Non-Adjacent Form (NAF) encoding also reduces the average point additions of the binary method to m/3. Thus, when these enhancements are used, the time complexity becomes equal to $m_0$ point doublings plus ($m_{(0)}/3+\log_2 u$) point additions.

The space complexity of the present method, in terms of number of stored points, depends on the number of partitions u that will be processed by the u processors using the binary method. Each processor requires storage of one point to perform scalar multiplications using the binary method. No pre-computations are required, and, accordingly, only the base point P will be also stored and shared between the parallel processors. Finally, the accumulation point will be required for the accumulation process at the end. Thus, the space complexity of the proposed method is equal to u+2 points.

It should be understood that the calculations may be performed by any suitable computer system, such as that diagrammatically shown in FIG. 1. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magnetooptical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It will be understood that the multiple processors required for parallel processing may be microprocessors, digital signal processors, application specific integrated circuits, or other suitable processors, or may be soft processors depending upon the capability of the computer or other cryptographic device, and may be discrete processors or may be multiple processing units incorporated onto a single integrated circuit. The method may be performed on multiple computers linked through a network, or may be performed on any suitable cryptographic device.

The method is of general application, and may be used wherever it is necessary to perform scalar multiplication, including public-key exchange, digital signatures, message encryption and decryption, etc. When used for public-key exchange, the method may further comprise keeping the scalar integer private and making the elliptic curve point and the scalar multiplication product public for establishing elliptic curve public-key agreement. When used for message encryption, the method may further comprise embedding a plaintext message onto a point on the elliptic curve to form a message point, and adding the message point to the scalar multiplication product in order to encrypt the plaintext message.

It is to be understood that the present invention is not limited to the embodiments described above, but encompasses any and all embodiments within the scope of the following claims.

We claim:

1. A method for generic-point parallel elliptic curve scalar multiplication using a cryptographic device, comprising the steps of:

partitioning a scalar integer, represented as a binary number, into a plurality of partitions;

adjusting the number of binary bits in each partition to distribute a number of point operations equally among the partitions by simultaneously solving the following set of equations:

$$m = m_{(u-1)} + m_{(u-2)} + \ldots + m_{(1)} + m_{(0)},$$

where $$m_{(u-1)} < m_{(u-2)} < \ldots < m_{(1)} < m_{(0)};$$

$$M_{(0)} = m_{(0)}(r) + \frac{m_{(0)}}{2}(s);$$

$$M_{(i)} = m_{(i)}(r) + \frac{m_{(i)}}{2}(s) + (r)\sum_{0 \leq j < i} m_j;$$

and $$M_{(0)} = M_{(1)} = \ldots = M_{(u-1)};$$

wherein m represents the number of bits in the binary representation of the scalar integer, $m_i$ represents the number of bits in the i th partition, r represents the number of field multiplications of a point doubling operation, and s represents the number of field multiplications of a point addition operation;

in each partition, computing a partial product of the partitioned scalar integer and a point on an elliptic curve, the partial products being computed simultaneously in parallel by a plurality of separate hardware processors; and accumulating the partial products from the plurality of partitions to obtain the scalar multiplication product of the scalar integer and the point on the elliptic curve.

2. The method for generic-point parallel elliptic curve scalar multiplication according to claim 1, further comprising the step of padding the binary representation of the scalar integer with zeros when necessary to solve the set of equations.

3. The method for generic-point parallel elliptic curve scalar multiplication according to claim 1, wherein the step of accumulating the partial products is performed on a different hardware processor than the hardware processors used to process the partitions in parallel.

4. The method for generic-point parallel elliptic curve scalar multiplication according to claim 1, further comprising the steps of keeping the scalar integer private and making the elliptic curve point and the scalar multiplication product public for establishing elliptic curve public-key agreement.

5. The method for generic-point parallel elliptic curve scalar multiplication according to claim 1, further comprising the steps of:

embedding a plaintext message onto a point on the elliptic curve to form a message point; and adding the message point to the scalar multiplication product in order to encrypt the plaintext message.

6. The method for generic-point parallel elliptic curve scalar multiplication according to claim 1, wherein the cryptographic device comprises a high-performance networked server.

7. A system for performing elliptic curve-based cryptographic communications, comprising:

a plurality of hardware processors;

software executable by the hardware processor, the software having:

means for partitioning a scalar integer, represented as a binary number, into a plurality of partitions;

means for adjusting the number of binary bits in each partition to distribute a number of point operations equally among the partitions, said means for adjusting the number of binary bits in each partition comprising means for simultaneously solving the following set of equations:

$$m = m_{(u-1)} + m_{(u-2)} + \ldots + m_{(1)} + m_{(0)},$$

where $$m_{(u-1)} < m_{(u-2)} < \ldots < m_{(1)} < m_{(0)};$$

$$M_{(0)} = m_{(0)}(r) + \frac{m_{(0)}}{2}(s);$$

$$M_{(i)} = m_{(i)}(r) + \frac{m_{(i)}}{2}(s) + (r)\sum_{0 \leq j < i} m_j;$$

and $$M_{(0)} = M_{(1)} = \ldots = M_{(u-1)};$$

wherein m represents the number of bits in the binary representation of the scalar integer, $m_i$ represents the number of bits in the i th partition, r represents the number of field multiplications of a point doubling operation, and s represents the number of field multiplications of a point addition operation;

means for, in each partition, computing a partial product of the partitioned scalar integer and a point on an elliptic curve, the partial products being computed simultaneously in parallel by the plurality of hardware processors; and means for accumulating the partial products from the plurality of partitions to obtain the scalar multiplication product of the scalar integer and the point on the elliptic curve.

* * * * *